J. M. McCALL.
DETACHABLE COAT COLLAR.
APPLICATION FILED JUNE 10, 1914.
1,219,335.
Patented Mar. 13, 1917.
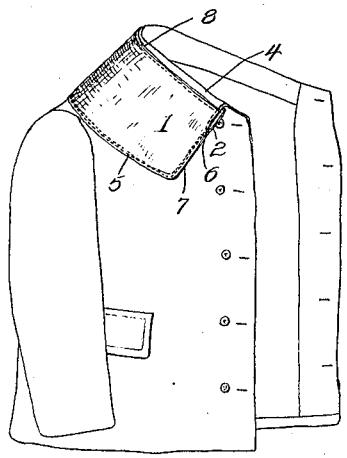
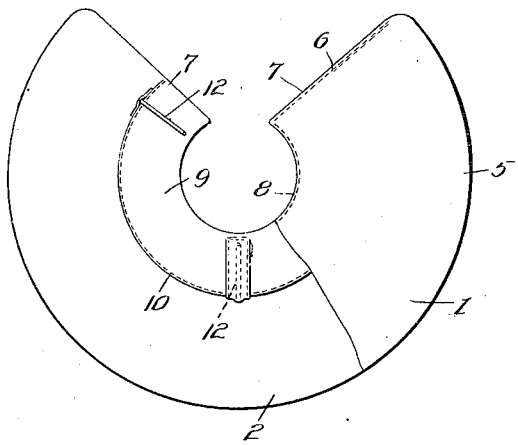
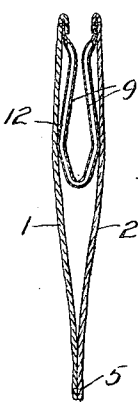
Inventor
J. M. McCall.
Witnesses
F. L. Gibson.
C. C. Hines.
By Victor J. Evans
Attorney

UNITED STATES PATENT OFFICE.

JOHN M. McCALL, OF BUTLER, PENNSYLVANIA.

DETACHABLE COAT-COLLAR.

1,219,335.  Specification of Letters Patent.  Patented Mar. 13, 1917.

Application filed June 10, 1914. Serial No. 844,267.

*To all whom it may concern:*

Be it known that I, JOHN M. McCALL, a citizen of the United States, residing at Butler, in the county of Butler and State of Pennsylvania, have invented new and useful Improvements in Detachable Coat-Collars, of which the following is a specification.

This invention relates to detachable coat collars, the object of the invention being to provide a detachable fur or storm collar which may be easily, quickly and conveniently applied to and removed from any ordinary type of coat collar.

A further object of the invention is to provide a novel construction of detachable collar embodying simple and effective means for firmly and securely fastening it to the coat collar.

The invention consists of the features of construction, combination and arrangement of parts herein fully described and claimed, reference being had to the accompanying drawing in which:—

Figure 1 is a view showing the application of the invention.

Fig. 2 is a sectional view taken transversely through the collar, showing the detachable collar applied as in Fig. 1.

Fig. 3 is a plan view of the detachable collar with one of the plies removed and the lining turned back to expose the receiving recess.

Fig. 4 is a section, similar to Fig. 2, through the detachable collar on an enlarged scale.

In carrying my invention into practice, I provide a detachable collar composed of superimposed plies 1 and 2, composed of fur, cloth or other suitable material, cut into the desired segmental form, corresponding to the shape of the coat collar 3 to which it is to be applied.

The plies 1 and 2 are connected around their outer edges by a marginal line of stitching 5, which line of stitching extends inwardly to the points 6, approximately midway of the width of the front edges 7 of the collar. The front portion of the collar is formed with a segmental cut out 8, and the front edges of the plies are attached around this cut out to the front edges of a segmental lining 9 composed of a strip of fabric or other suitable material. This strip of material is folded upon itself and its fold line 10 extends backward approximately one-half the depth or width of the collar, or any other desired depth or width. By this construction the front edges of the plies and the corresponding portions of the lining to which they are attached form a receiving pocket or recess 11 of proper depth around the front of the collar to receive the coat collar 4, by which the detachable collar is adapted to be fitted thereon.

In order to hold the detachable collar in position, clamps 12 of spring wire metal are provided. These clamps 12 are approximately of U-form, and have their arms respectively secured between the plies of the collar and portions of the lining, and adapt the same to grip the opposite sides of the collar 4 to clamp the detachable collar in position thereon. It will be noticed that a plurality of strips are secured (see Fig. 3 where one of these strips is shown) on the segmental strip and adapted to form pockets for the reception of the clamp 12, and these pockets serve to effectively support the clamp. In applying the detachable collar to the coat collar 4, the front of the detachable collar is spread or opened to admit the collar 4, whereby the bifurcated portion of the detachable collar is adapted to be slipped over in position thereon to be held, when the plies of the detachable collar are released, in position upon the collar 4 by the spring clamps.

By means of my invention a detachable collar of fur or other suitable material may be applied to an ordinary coat collar when desired to change the appearance of the coat collar or to convert an ordinary coat collar into a fur collar, the construction being such that the detachable collar may be applied and removed at will and when applied will be held securely in position against displacement.

I claim:—

A detachable coat collar consisting of a pair of superposed plies of material having outer segmental edges secured together and formed with a relatively small central opening concentric with its segmental edge, a folded segmental strip of material having its outer segmental edge secured to the edge of said opening so that its sides may hang between said plies, a plurality of strips secured on said segmental strip and forming pockets and a series of spring metal clamps disposed in said pockets each clamp being folded so as to have its folds supported in said pockets with its sides converging in separated relation toward the edge of said opening.

In testimony whereof I affix my signature in presence of two witnesses.

JOHN M. McCALL.

Witnesses:
MILES G. SMITH,
WALTER GRIFFINS.

Copies of this patent may be obtained for five cents each, by addressing the "Commissioner of Patents, Washington, D. C."